United States Patent
Harrah

[15] 3,672,325
[45] June 27, 1972

[54] TRANSDUCER WITH VISIBLE OUTPUT

[72] Inventor: Robert S. Harrah, P.O. Box 14410, Houston, Tex. 77021

[22] Filed: June 12, 1970

[21] Appl. No.: 45,624

[52] U.S. Cl. .................................. 116/70, 73/388, 74/89.2
[51] Int. Cl. ........................................................ G01l 19/12
[58] Field of Search .............. 116/114, 70, 129; 73/410, 388, 73/411; 200/61.45, 52; 74/89.20

[56] References Cited

UNITED STATES PATENTS

| | | | |
|---|---|---|---|
| 2,764,894 | 10/1956 | Faxen | 74/89.20 |
| 3,452,175 | 6/1969 | Wilkes | 200/61.45 UX |
| 3,452,309 | 6/1969 | Wilkes | 200/52 X |
| 3,512,498 | 5/1970 | Luebke | 116/114 |
| 3,555,909 | 1/1971 | Harrah | 116/129 X |

OTHER PUBLICATIONS

Publication Research Report SC-RR-67- 656A Dec. 1967, Rolamite: New Mechanical Design Concept D. F. Wilkes, 1322 Sandia Laboratory Albuquerque.

Primary Examiner—Louis J. Capozi
Attorney—Donald Gunn

[57] ABSTRACT

An indicator which discloses the state of a rolamite which includes a housing, a band wound in reverse bights about a pair of rollers to form a cluster. The cluster moves between two positions in the housing. The present invention incorporates a shield on the side of the housing, the shield including a pair of openings which permit visual inspection of the position of the rolamite. Preferably, the rollers are color coded to enhance visual inspection. A transducer means operates the rolamite.

20 Claims, 7 Drawing Figures

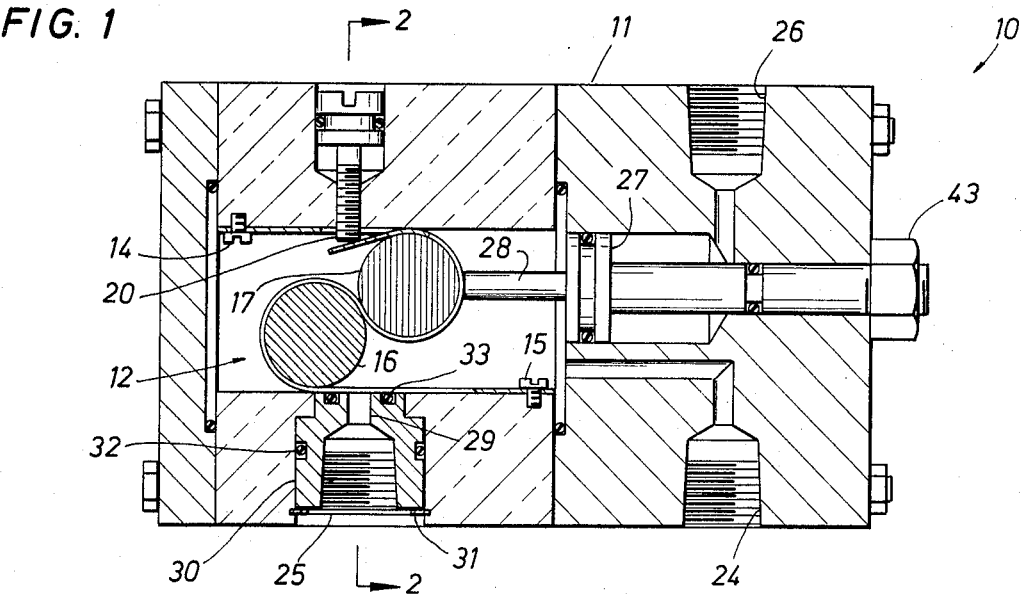
FIG. 1
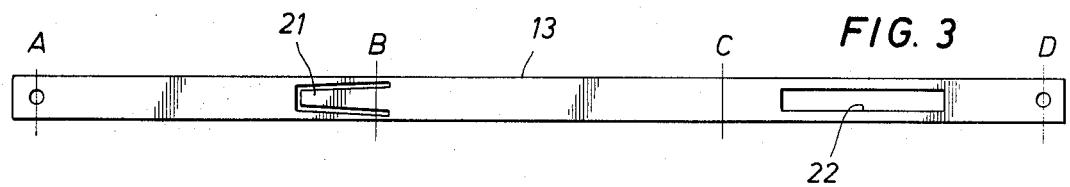
FIG. 3
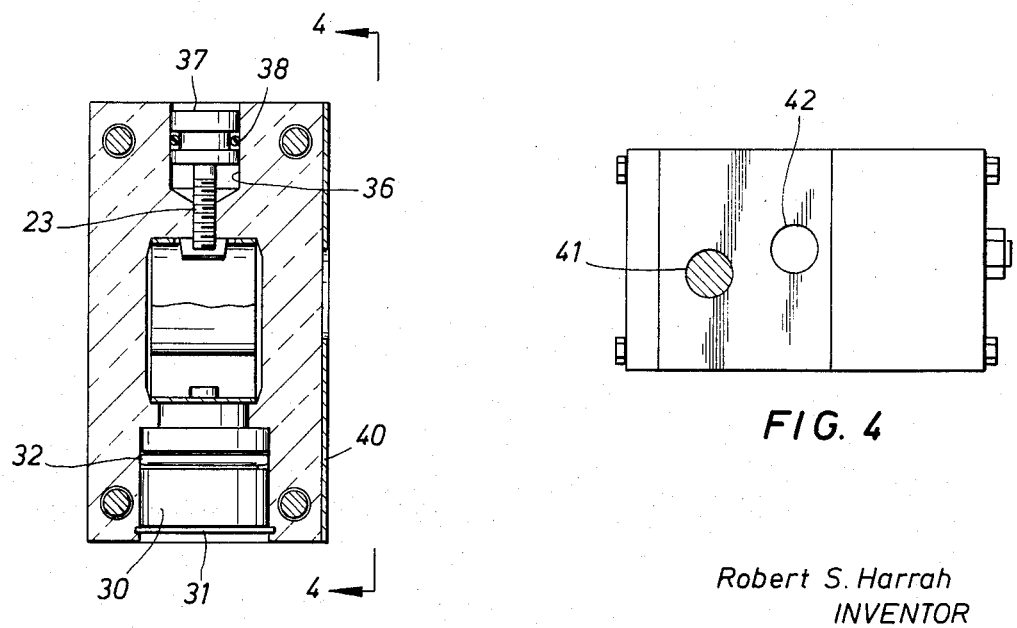
FIG. 2
FIG. 4
Robert S. Harrah
INVENTOR
BY Donald Gunn
ATTORNEY Robert S. Harrah
INVENTOR BY Donald Gunn
ATTORNEY

3,672,325

TRANSDUCER WITH VISIBLE OUTPUT

RELATED APPLICATIONS

The present application is related to application Ser. No. 869,718, filed Oct. 27, 1969.

SUMMARY OF PROBLEM AND SOLUTION

Rolamites have found acceptance in industry in the last few years. Many points of use include motion or movement translators and the like. The rolamite has been described in the related application mentioned above as a vibration sensor. Other uses have included applications as electrical switches and the like. In many, or most, cases, it has been difficult to create an optimum visual indicator. The present invention supplies such a need.

The present invention shall be described cooperative with a rolamite used as a vibration or pressure actuator although such devices are only supporting structure describing one point of application. Moreover, this novel device finds application with any rolamite, even those tripped by position, vibration, switch gear, and so on. For sake of definition, the rolamite will be described cooperative with a transducer means which causes the rolamite cluster to move between two positions.

The present invention should be considered in many regards, particularly the manner in which it provides a visible indication even at a distance indicating the operative status of the rolamite. It provides only two signals, one indicating that the rolamite has been tripped, and the other indicating that it has not been tripped. The supporting structure is summarized as including a rolamite cluster within a housing. A pneumatic line supplies air pressure to the housing. The band of the rolamite closes a port in the untripped position, but tripping of the rolamite and movement of the band opens the port. The side view of the rolamite, including the two rollers cooperative with the band, is covered over with a shield, the shield including a pair of openings which are located such that one of the rollers is visible in the untripped or first position and one of the rollers is visible in the tripped or second position through the other port. Color coding can be used as desired. It will be seen that movement of the rolamite cluster from one position to the other forms a visible signal indicating the position of the rolamite.

Many objects and advantages of the present invention will become more readily apparent from a consideration of the following specification and drawings, wherein:

FIG. 1 is a sectional view through a vibration sensor utilizing a rolamite cluster, there being a pneumatic indicating system cooperative with the indicator and a pneumatic reset mechanism also included;

FIG. 2 is a sectional view taken along the line 2 — 2 of FIG. 1 illustrating details of construction of the sensitivity adjustment at the upper end and the signal port at the lower end;

FIG. 3 shows the rolamite band, including cutouts at various points;

FIG. 4 is a sectional view taken along the line 4 — 4 of FIG. 2 showing the masking shield of the present invention and through which is viewed the rolamite cluster for the purpose of forming a visible indication in accordance with the teachings of the present invention;

Figure 5:
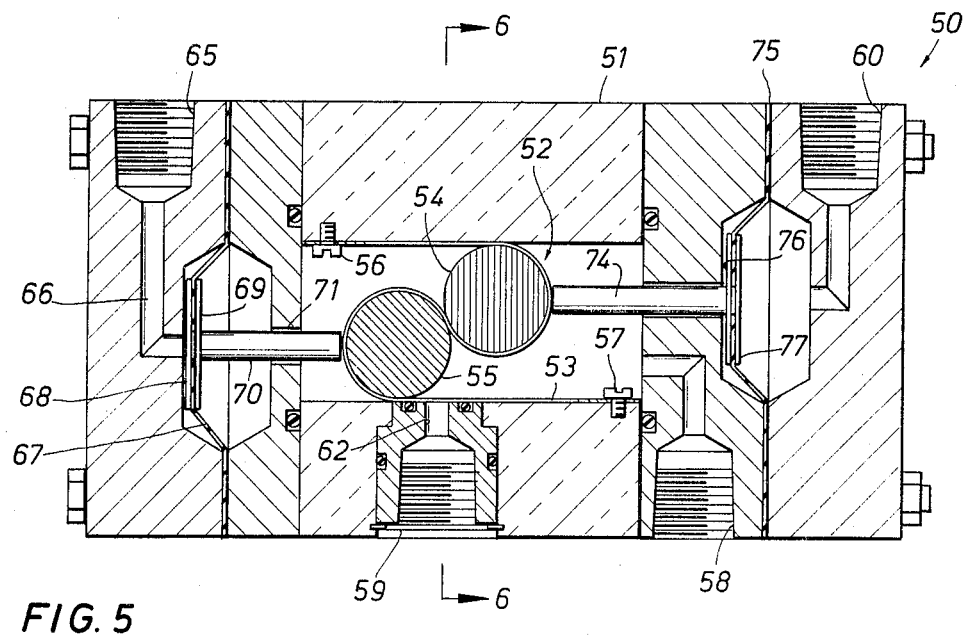
FIG. 5 is a sectional view through an embodiment similar to that of FIG. 1 except that the embodiment of FIG. 5 is responsive to pressure.
Figure 6:
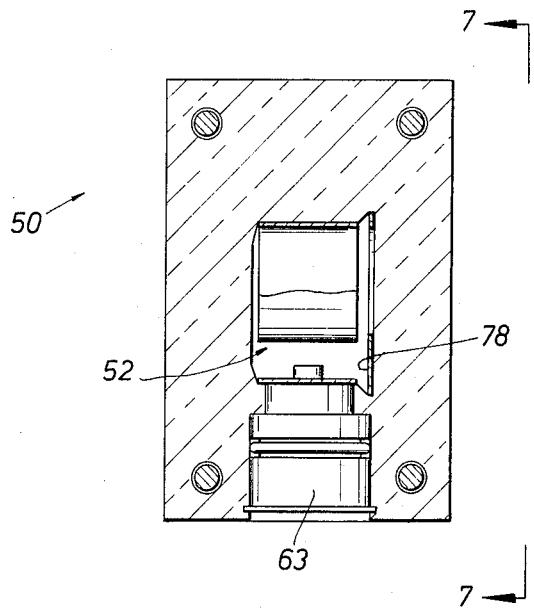
Figure 7:
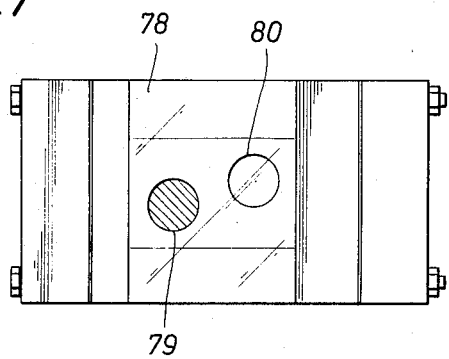

FIG. 6 is a sectional view taken along the line 6 — 6 of FIG. 5 showing details of construction of the signal port and its cooperative arrangement with respect to the rolamite cluster; and, FIG. 7 is a sectional view taken along the line 7 — 7 of FIG. 6 illustrating the shield positioned over the rolamite cluster for the purpose of indicating the position of the cluster and hence, the operative condition of the transducer.

In the drawings, attention is first directed to FIG. 1 which illustrates a vibration transducer 10 in sectional view. The vibration detector 10 of FIG. 1 is quite similar to that of co-pending application Ser. No. 869,718, filed Oct. 27, 1969, where a more complete, thorough description of the vibration detector 10 may be found in the co-pending application. Certain components will be identified herein for the purpose of describing the improvements found in the present invention.

In the main, a body 11 encloses a rolamite movement or cluster indicated generally at 12. The rolamite cluster incorporates a flexible band 13 best shown in FIG. 3. The band 13 is anchored at both ends by set screws 14 and 15. The band 13 is looped into a pair of bights to encapture a pair of rollers 16 and 17. The band is enclosed in the housing 11 which has preferably parallel side walls so that the rolamite cluster rolls to the left or to the right, the contact of the rollers 16 and 17 being merely rolling contact and not slipping or frictional movement.

The rolamite is well known as being a low friction device. It is utilized in the present invention as a vibration sensor. The sensor 10 is installed so that the vibration tends to rock the cluster 12 to the left and right as viewed in FIG. 1. The sensitivity of the vibration detector is controlled through adjustment of the protruding screw 20. The adjustment screw 20 bears against a tab 21 best shown in FIG. 3. The tab 21 biases the rolamite cluster 12 against movement to the left, and indeed, as the adjustable screw 20 is extended, the tab 21 forces the rolamite cluster to the right of FIG. 1.

The numeral 22 indicates a cutout portion in the band 13 shown in FIG. 3. The cutout portion is located near the screw 15 which anchors the right hand end of the band. While the tab 21, bent or deflected in the manner shown in FIG. 1, increases the bias acting on the rolamite cluster and thus is a bias force to the right, the cutout 22 decreases the springiness of the band and when the roller 16 rolls to the point of the cutout 22, the centering bias force acting at the roller 16 is decreased or, stated alternatively, an additional bias force tending to move the cluster to the right is created. Thus, the vibration detector 10 will merely oscillate in response to vibrations below a certain magnitude, but, the cluster 12 moves rapidly to the right on excessive vibration when the roller 16 moves over the cutout 22.

The vibration detector forms a pneumatic signal as described in the co-pending patent application. An inlet supply port 24 connected with a source pressurizes the chamber of the housing 11. The port 25 provides a pneumatic signal conditioned on tripping of the vibration detector. The port 26 is an inlet for a pulse of pressure which moves a piston 27 and a connecting push rod 28 to re-set the cluster 12 to the far left hand position.

The pneumatic signal is formed when the band 13 is removed from the opening of the port 29 shown in FIG. 1. An insert 30 is received in a relatively large drilled opening and is locked in position by a lock ring 31. The insert 30 is equipped with suitable O-ring seals at 32 while an O-ring 33 contacted against the band 13 of the rolamite cluster seals against leakage through the port 25.

It will be seen from the foregoing description that a pneumatic signal is formed and communicated through the port 25 for cooperation with other equipment. The pneumatic signal is utilized by other equipment in a manner not pertinent to actual operation of the vibration indicator 10 but which is noted in passing.

Attention is momentarily directed to FIG. 2 of the drawings which illustrates the insert 30 which is secured in position by the lock ring 31. The exterior of the insert is grooved to receive the O-ring 32 as previously mentioned. In the upper portions of FIG. 2, the screw 20 extends through a threaded receptacle or opening in the housing 11, there being a recessed chamber 36 for receiving the head 37 of the screw. The screw is preferably screw driver adjustable, and has a slot across the head for that purpose. To prevent leakage past the screw, an O-ring 38 is received in the outer periphery of the head 37 to seal against leakage.

Attention is next directed to a shield 40 which is formed on one face of the housing 11. It is presumed at this juncture that the housing is formed of clear or transparent plastic so that the rolamite cluster therein may be viewed from the exterior. The shield is glued or otherwise joined to the side wall of the housing 11. The shield is of sufficient gauge of metal to have adequate structure in its own right, and may be any metal such as steel, aluminum, or the like. It may be colored, enamelled, or finished in any desired manner. Of particular interest to the present invention is the pair of openings 41 and 42 as best shown in FIG. 4. The openings 41 and 42 permit visual inspection of the vibration indicator 10 to ascertain the position of the rolamite cluster, and hence, the operative condition of the vibration transducer.

Preferably, the end faces of the rollers 16 and 17 adjacent to the shield 40 are painted or otherwise colored, perhaps one being white and the other green or red. The color coding is immaterial, but the purpose of the color is to form visible signals which can be inspected upon viewing the shield 40. As shown in FIG. 4, the roller 16 is visible through the cutout 41. The roller 16, when seen through the opening 41, indicates that the vibration transducer 10 has not tripped. On the other hand, if the roller 17 is visible through the port 42, this is a visual indication that the vibration transducer has tripped. It will be understood that the two openings are so located that no ambiguities occur, and their separation along the length of the housing of the transducer is preferably such that the visible signal is formed in the port 42 when the cluster moves to the tripped position. The ports 41 and 42 are perhaps slightly smaller than the rollers 16 and 17.

In summation, the vibration transducer 10 forms a visible signal. The visible signal is dependent on the colors seen through the ports 41 and 42, the color being carried on the rollers 16 and 17 at their end faces.

The re-set mechanism 43 shown in FIG. 1 may be hand operated, or may be pneumatically operated by providing a signal through the port 26 to return the cluster to the original illustrated position.

The operation of the vibration transducer 10 is best explained in the co-pending patent application. The operation of the present invention in conjunction with the vibration transducer is believed now understood based on the co-pending disclosure and this disclosure. Consequently, attention is next directed to FIGS. 5, 6 and 7 of the drawings for a description of the pressure transducer in accordance with the teachings of the present invention.

In FIG. 5, the numeral 50 indicates a pressure transducer. The pressure transducer incorporates a housing 51. Within the housing 51 is located a rolamite cluster 52 which comprises a band 53, a first roller 54, and a second roller 55. The housing preferably provides parallel side walls for contact with the band 53, the band 53 being secured in position by a pair of screws 56 and 57.

The pressure transducer forms a pneumatic signal in the same manner as the vibration transducer 10 just described. The numeral 58 identifies a pressure inlet port while the numeral 59 identifies the signal port. The numeral 60 identifies a port which is adapted to be connected with a pressure line to reset the mechanism as will be described. Air is introduced through the port 58 and into the chamber of the housing 51. The rolamite band 53 passes over the opening 62 in communication with the port 59 to form a pneumatic signal indicating the opening or closing of the port 62. As shown in FIG. 6, an insert assembly 63 preferably similar to the assembly 30 shown in FIG. 2, is installed in the housing 11. It includes a similar O-ring, snap ring, and internally threaded receptacle as previously described.

The pressure transducer 50 is responsive to pressure exceeding a predetermined level. A port 65 is connected with a pressure source to be monitored. The port 65 communicates through a passage 66 to one side or face of a movable diaphram 67. The diaphram is resilient and tends to maintain the left-hand position as shown in FIG. 5. The diaphram 67 is preferably formed of a resilient material, such as rubber, metal or the like, and at its center, it incorporates a pair of facing discs 68 and 69. The discs provide central support for the diaphram 67 and a point of connection for a plunger 70 which is carried on the diaphram which extends through an opening and guide at 71 to move the rolamite cluster 52 to the right.

The diaphram 67 is responsive to the pressure differential applied through the line 65 and 58. It will be recalled that the pressure in the line 58 is the pressure which also forms the pneumatic signal. The two-fold use of the pressure through the port 58 is not mandatory, but may be incorporated as an economy in the construction of the present device.

The diaphram 67 is made of a resilient material of sufficient strength to be snap-acting upon increase of pressure beyond a certain level. For instance, if the differential exceeds 50 psi, the diaphram can be so constructed and installed as to snap quickly to the right and to move the plunger 70 to the right, upsetting the balance position of the rolamite cluster.

The numeral 74 identifies a plunger indicated at the right hand portions of the equipment which is moved by pressure acting on a diaphram 75. The diaphram 75 incorporates the centrally located support disc 76 and 77, and is similar in most, if not all, regards to the diaphram 67 at the opposite end of the equipment. The diaphram 75 is used as a re-set mechanism. A pulse or surge of air through the port 60 moves the diaphram to the left, and moves the plunger with it. The plunger 74 returns the rolamite cluster 52 to its original position, sealing the port 62, and thereby terminating the tripped condition of the indicator 50.

Attention is next directed to FIG. 6 of the drawings which illustrates the indicator 50 in sectional view. It will be noted that the rolamite cluster 52 is found within the body of a housing formed of plastic or some other suitable material. Preferably, the material is transparent. It particularly includes a recessed shield 78 on one side of the rolamite cluster. The shield 78 is likewise shown in FIG. 7, and it includes a pair of openings at 79 and 80. The openings 79 and 80 are similar to the openings 41 and 42 shown in FIG. 4. That is, the rolamite cluster is seen through the openings 79 and 80. However, only one roller is seen at a time, and it is preferably color coded as represented in FIG. 7. The color coding, being visible, yields a visible signal of the operative state or condition of the transducer 50. In this regard, the structure shown in FIG. 7 is generally similar to that of FIG. 4 with the exception that the shield is recessed within the structure in FIG. 6, while in FIG. 2, it is shown on the outer wall.

The foregoing describes the indicating means of the present invention with both a vibration transducer 10 and a pressure transducer 50. It may be extended to include a temperature transducer wherein a snap acting bimetal member is substituted for the diaphram 67 in FIG. 5 for the purpose of triggering a temperature transducer. It may likewise be used as a positional indicator wherein suitable linkage is used to move the rolamite cluster and again form a signal indicative of a tripped condition. The examples mentioned herein may be extended, it being noted in all cases that the invention incorporates a shield and appropriate openings therein for the purpose of forming a visible indication of the condition of the transducer. The variable to be measured may be varied accordingly. The present invention is particularly adapted for use in stationary engines, rotating equipment, pumps, compressors, and the like. The transducers may be utilized to measure vibrations, pressure of the water jacket, oil pressure, and so on. Numerous other points of installation may be identified. In any case, the transducers are mounted thereon and are preferably positioned with the shielded side facing a suitable point of perspective to permit visual inspection of the transducer and the equipment associated therewith.

The terminology applied to the several embodiments herein is hereby adopted for the claims which are appended hereto which determine the scope of the present invention.

What is claimed is:

1. A transducer for forming a visible indication of its operative state, comprising a housing;
  rolamite cluster means positioned in said housing, said means incorporating an elongate flexible member formed into an S-shaped curve having two bights and capturing a pair of generally round roller means therein, said roller means having end faces at least on one common side of said housing;
  shield means associated with the one side of said housing, there being a plurality of openings in said shield means permitting visual inspection therethrough of said rolamite cluster means and the ends of said roller means;
  said housing and said rolamite cluster means being cooperatively adapted for moving said cluster means to at least a first and a second position in said housing; and,
  said shield means and said rolamite cluster means being cooperatively arranged to form visible signals through said shield means of at least one of the positions of said rolamite cluster means and viewing the end of said roller means.

2. The invention of claim 1 including a vibration transducer means cooperative with said rolamite cluster means and which moves said rolamite cluster means from a first to a second position on exceeding vibrations above a certain level.

3. The invention of claim 1 including a pressure transducer means responsive to the pressure of a given source to be monitored, said transducer means including means cooperative with said rolamite cluster means for moving said rolamite cluster means from a first to a second position indicative of the exceeding of pressure of a certain set level.

4. The invention of claim 1 including pressure transducer means responsive to pressure differential acting thereon, said means cooperative with said rolamite cluster means to move said rolamite cluster means from a first to a second position indicative of exceeding pressure differentials above a certain level.

5. The invention of claim 1 wherein one of said openings in said shield means permits viewing of the end of said roller means when said rolamite cluster means is in the first position.

6. The invention of claim 1 wherein one of said openings in said shield means permits viewing of the end of said roller means when said rolamite cluster means is in the second position.

7. The structure of claim 1 wherein said openings in said shield are formed of transparent material.

8. The structure of claim 1 wherein said shield means is attached to the side of said housing.

9. The structure of claim 1 wherein said shield means includes two openings located such that the first opening views the end of one of said roller means when said rolamite cluster means is in one position and the second opening views none of said roller means, and wherein said second opening views the end of one of said roller means when said rolamite cluster means is in a second position and said first opening views none of said roller means.

10. The structure of claim 1 wherein the ends of said roller means are adapted to be color coded.

11. The structure of claim 1 wherein said housing includes a pair of spaced side walls and said flexible member is selectively positioned adjacent to one of said side walls by operation of said rolamite cluster means, and further including a port means formed in said side wall and so located that said rolamite cluster means controls flow through said port means on movement from the first to the second position.

12. The invention of claim 11 wherein said port means is adapted to be communicated with a pressure responsive device and a supply of pressure fluid, the elongate band closing said port means in a first condition of the transducer which is achieved by positioning said rolamite cluster means at its first position, and wherein said rolamite cluster means moves to its second position to open or expose said port means to the passage of pressure fluid therethrough.

13. The structure of claim 11 wherein said flexible member is connected at one end portion to said side wall at a distance from said port means, and said flexible member extends parallel to said wall and passes over said port means to selectively close said port means.

14. The structure of claim 11 incorporating a surrounding seal means positioned about said port means, said seal means cooperatively closing said port means on co-action with said flexible member.

15. The structure of claim 1 wherein said flexible member includes a projecting tab portion, and further including an adjustably movable sensitivity control means in said housing cooperatively arranged with said tab portion, said means creating a variable and adjustable bias acting on said flexible member on movement to one of said positions.

16. The structure of claim 1 wherein said housing includes a chamber closed to the atmosphere, said chamber having a pair of port means selectively opening thereinto with one of said port means being adapted to be connected to a remote pressure to be tested, and the other being adapted to be selectively opened and closed to form a pneumatic signal indicative of the position of said rolamite cluster means.

17. The structure of claim 1 wherein said shield means is formed of opaque material within said housing.

18. A transducer for forming a visible indication of its operative state, comprising:
  a housing;
  rolamite cluster means found in said housing;
  shield means associated with said housing and facing a desired direction, there being a plurality of openings defined by said shield means permitting visual inspection by an observer;
  said housing and said rolamite cluster means being adapted for moving said cluster means between a first and second position in said housing;
  shield means and said rolamite cluster means cooperating to form visible signals of said first and second positions to indicate the operative position of the rolamite cluster means; and,
  a re-set means cooperative with said rolamite cluster means to return it to its first position.

19. The invention of claim 18 wherein the re-set means incorporates a plunger for moving said rolamite cluster means within said housing, said plunger being activated by a pressure responsive means connected to said housing.

20. The invention of claim 18 including a pair of re-set plungers operative in opposite directions to re-set said rolamite cluster means to two positions.

* * * * *